United States Patent

Hughes

[15] 3,638,045

[45] Jan. 25, 1972

[54] PULSE STRETCHER

[72] Inventor: Richard Smith Hughes, China Lake, Calif.

[73] Assignee: The United States of America as represented by the Secretary of the Navy

[22] Filed: Apr. 14, 1969

[21] Appl. No.: 815,708

[52] U.S. Cl. ..............................307/267, 307/235, 307/246, 328/58, 328/151

[51] Int. Cl. ..........................................................H03k 5/04

[58] Field of Search ....................307/235, 246, 267; 328/58, 328/151

[56] References Cited

UNITED STATES PATENTS

| | | | |
|---|---|---|---|
| 2,688,697 | 9/1954 | Lawson et al. | 328/151 X |
| 2,902,674 | 9/1959 | Billings et al. | 307/267 X |
| 3,066,261 | 11/1962 | Smith et al. | 328/151 X |
| 3,375,501 | 3/1968 | McCutcheon et al. | 328/151 X |
| 3,469,112 | 9/1969 | Hands et al. | 328/151 X |

OTHER PUBLICATIONS

Pub I " Pulse Stretcher" by Fritz et al., in IBM Tech. Disclosure Bulletin, Vol. 7, No. 6, November 1964, pages 548– 549.

*Primary Examiner*—Stanley D. Miller, Jr.
*Attorney*—Edgar J. Brower and Roy Miller

[57] ABSTRACT

A follow-hold circuit wherein the output follows the input until an external gating trigger disables the circuit whereupon the output remains at the last input level until the gating trigger enables the circuit again wherein the circuit comprises a differential feedback video amplifier and transistorized switch.

1 Claims, 1 Drawing Figure

PATENTED JAN 25 1972 3,638,045
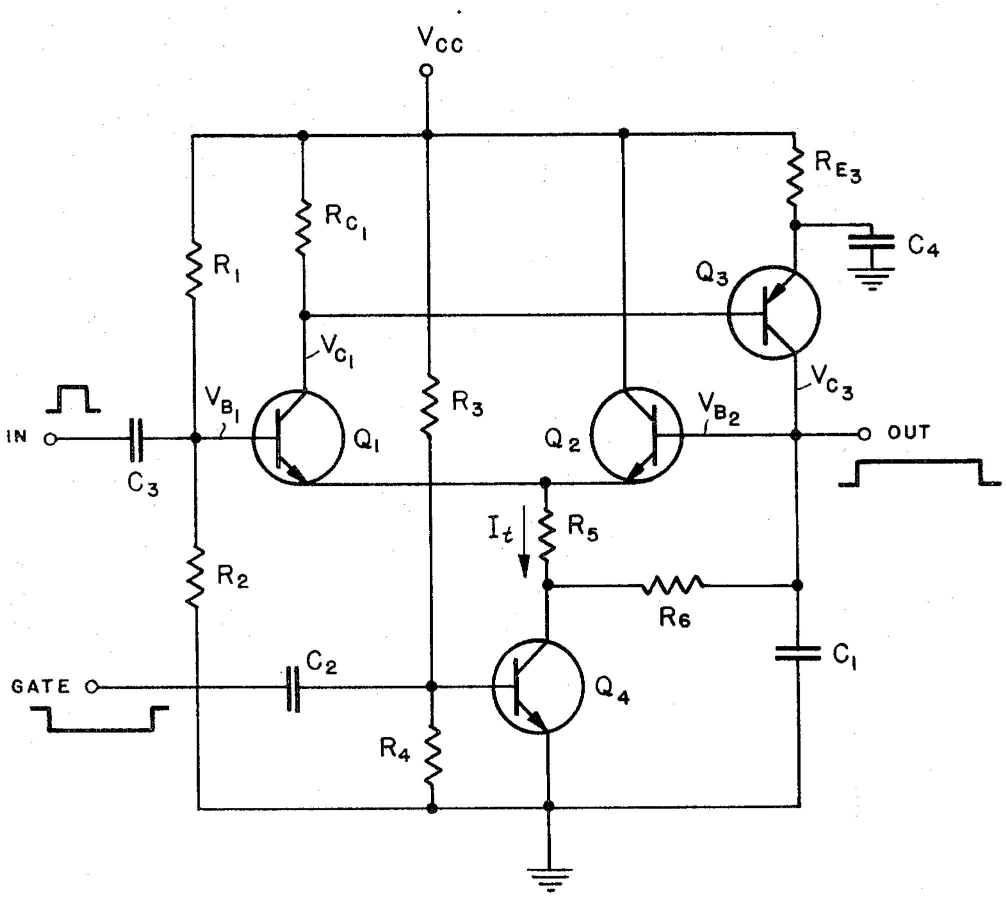
INVENTOR.
RICHARD SMITH HUGHES
BY
ROY MILLER
ATTORNEY.

PULSE STRETCHER

GOVERNMENT INTEREST

The invention described herein may be manufactured and used by or for the Government of the United States of America for governmental purposes without the payment of any royalties thereon or therefor.

BACKGROUND OF THE INVENTION

Many times when working with narrow pulses it is desirable to "stretch" the width of the pulse. For instance a circuit that will follow and hold a narrow incoming pulse, i.e., 100 nanoseconds may be very useful when one is interrogating such narrow pulses. It is essential that any circuit that provides the "stretching" have a very fast rise and fall time and follow the incoming pulse amplitude very accurately.

BRIEF DESCRIPTION OF THE DRAWING

The drawing is a circuit diagram of the preferred embodiment of the invention.

DESCRIPTION OF THE PREFERRED EMBODIMENT

The circuit illustrated in the drawing utilizes a differential feedback video amplifier as a follow-hold amplifier. Transistors $Q_1$, $Q_2$ and $Q_3$ represent the differential feedback video amplifier. Transistor $Q_4$ is a switch, normally on, that disables $Q_1$, $Q_2$ and $Q_3$ when it is turned off.

Circuit operation is as follows. A narrow pulse, for instance 100 nanoseconds wide, is coupled in through coupling capacitor $C_3$ to the base of transistor $Q_1$. $Q_4$, the gating transistor, is biased on at this time, that is, it is in its normal condition. The capacitor, $C_1$, is charged almost immediately to the input amplitude via the large gain of $Q_1$ and $Q_3$. When the output amplitude equals the input amplitude, the closed loop gain equals 1 and the output is a faithful representation of the input amplitude. If $Q_4$ is disabled at this time, $Q_1$, $Q_2$, and $Q_3$ are turned off and $C_1$ will maintain the charge thereon. The only discharge path for $C_1$ at this time is through the high impedance of the back-biased junctions $V_{EB}(Q_2)$, $V_{EB}(Q_1)$, $V_{CB}(Q_3)$ and $V_{CB}(Q_4)$.

In order to terminate the output pulse, $Q_4$ is enabled by coupling another positive pulse through coupling capacitor $C_2$ to the base thereof and the charge on $C_1$ discharges through $R_6$ and $Q_4$ until $V_B(Q_2)=V_B(Q_1)$. If $V_B(Q_1)$ is zero, $V_B(Q_2)$ will also drop to zero.

If a high-impedance amplifier, for instance a field effect transistor source follower, is connected to the output, a narrow pulse can be stretched to several hundred microseconds.

A circuit analysis follows:

$$V_{c_1}=V_{cc}-\frac{I_t R_{c_1}}{2}$$

$$V_{c_3}=V_{B_2}=V_{B_1}$$

$$V_{B_1}=\left(\frac{I_t R_{c_1}}{2}=V_{B_3}\right)\frac{R_6}{R_{E_3}}$$

$$V_{B_1}=\left[\frac{I_t R_{c_1}}{2}-V_{BE_3}\right]\frac{R_6}{R_{E_3}}$$

$$V_{B_1}=\frac{R_2 V_{cc}}{R_1+R_2}$$

and $$I_t\approx\frac{V_{B_1}}{R_5}$$

$C_4$, connected between the emitter of $Q_3$ and ground, is a decoupling capacitor to prevent high-frequency ripple from appearing at the output and increases the open-loop gain of $Q_3$.

The configuration set forth in the drawing is described using NPN-transistors and positive pulses. For a negative pulse follow-hold, one would merely substitute PNP-transistors.

What is claimed is:

1. A follow-hold circuit comprising:

input means adapted to receive an input pulse having width and amplitude;

electronic follower means coupled to said input means and having an output when enabled, for producing an output pulse having the same amplitude as the input pulse, at said output, including a differential feedback video amplifier having a plurality of transistors, two of which have a like terminal coupled in common;

holding means coupled to said follower means and said output and being operative to electrically hold said output pulse at said amplitude for a period of time, comprising a capacitor which is charged to the input pulse amplitude; and gating means coupled to said follower means and said holding means for electrically controlling the width of the output pulse, including a transistorized switch and a gating signal input coupled to said transistorized switch, wherein said transistorized switch is coupled to said holding means and said like terminals coupled in common such that when a gating signal pulse is applied to said gating signal input said transistorized switch will be enabled, which will enable said differential amplifier and discharge said holding means capacitor, and when said transistorized switch is not enabled said differential amplifier will be disabled and said holding means will hold said output pulse at said same amplitude.

* * * * *